US012435198B2

(12) United States Patent
Movahhed et al.

(10) Patent No.: US 12,435,198 B2
(45) Date of Patent: Oct. 7, 2025

(54) MOLDING BASED ON A MONOLITHIC ORGANIC AEROGEL

(71) Applicant: aerogel-it GmbH, Osnabrueck (DE)

(72) Inventors: Sohajl Movahhed, Cologne (DE); Marcel Nobis, Lemfoerde (DE); Marc Fricke, Lemfoerde (DE); Wibke Loelsberg, Ludwigshafen (DE); Dirk Weinrich, Lemfoerde (DE)

(73) Assignee: aerogel-it GmbH, Osnabrueck (DE)

( * ) Notice: Subject to any disclaimer, the term of this patent is extended or adjusted under 35 U.S.C. 154(b) by 742 days.

(21) Appl. No.: 17/603,461

(22) PCT Filed: Apr. 9, 2020

(86) PCT No.: PCT/EP2020/060129
§ 371 (c)(1),
(2) Date: Oct. 13, 2021

(87) PCT Pub. No.: WO2020/212241
PCT Pub. Date: Oct. 22, 2020

(65) Prior Publication Data
US 2022/0195137 A1 Jun. 23, 2022

(30) Foreign Application Priority Data

Apr. 15, 2019 (EP) ..................... 19169258
Mar. 17, 2020 (EP) ..................... 20163623

(51) Int. Cl.
| | |
|---|---|
| *C08J 9/28* | (2006.01) |
| *B29C 43/02* | (2006.01) |
| *B29K 75/00* | (2006.01) |
| *B29K 105/00* | (2006.01) |
| *C08G 18/08* | (2006.01) |
| *C08G 18/22* | (2006.01) |
| *C08G 18/32* | (2006.01) |
| *C08G 18/76* | (2006.01) |
| *C08J 9/36* | (2006.01) |
| *F16L 59/02* | (2006.01) |
| *F16L 59/04* | (2006.01) |

(52) U.S. Cl.
CPC .......... *C08J 9/283* (2013.01); *C08G 18/0852* (2013.01); *C08G 18/225* (2013.01); *C08G 18/3243* (2013.01); *C08G 18/7671* (2013.01); *C08J 9/36* (2013.01); *F16L 59/029* (2013.01); *F16L 59/04* (2013.01); *B29C 43/02* (2013.01); *B29K 2075/00* (2013.01); *B29K 2105/0061* (2013.01); *C08G 2110/0058* (2021.01); *C08G 2110/0091* (2021.01); *C08J 2201/0502* (2013.01); *C08J 2203/08* (2013.01); *C08J 2205/026* (2013.01); *C08J 2375/12* (2013.01)

(58) Field of Classification Search
CPC .............................. C08J 9/00–9/42
See application file for complete search history.

(56) References Cited

U.S. PATENT DOCUMENTS

| | | |
|---|---|---|
| 2005/0100728 A1 | 5/2005 | Ristic-Lehmann et al. |
| 2006/0211840 A1 | 9/2006 | Lee |
| 2007/0259979 A1 | 11/2007 | Lee |
| 2008/0057334 A1* | 3/2008 | Schroth ..................... E04B 1/80 428/545 |
| 2008/0199678 A1 | 8/2008 | Klassen et al. |
| 2014/0287641 A1 | 9/2014 | Steiner, III |
| 2016/0244585 A1 | 8/2016 | Schädler et al. |
| 2016/0380244 A1 | 12/2016 | Evans et al. |
| 2017/0210092 A1 | 7/2017 | Rikleen et al. |

FOREIGN PATENT DOCUMENTS

| | | |
|---|---|---|
| DE | 102005021994 A1 | 11/2006 |
| EP | 2615132 A1 | 7/2013 |
| WO | WO-95/02009 A1 | 1/1995 |
| WO | WO-95/03358 A1 | 2/1995 |
| WO | WO-96/37539 A1 | 11/1996 |
| WO | WO-2008/138978 A1 | 11/2008 |
| WO | WO-2014/068105 A1 | 5/2014 |
| WO | WO-2016/008726 A1 | 1/2016 |
| WO | WO-2016/053399 A2 | 4/2016 |
| WO | WO-2017/125414 A1 | 7/2017 |
| WO | WO-2017/125415 A1 | 7/2017 |

OTHER PUBLICATIONS

Shinko et al. "Crosslinked polyurea-co-polyurethane aerogels with hierarchical structures and low stiffness", Journal of Non-Crystalline Solids, 487, (2018); pp. 19-27.*
Diascorn et al. "Polyurethane aerogels synthesis for thermal insulation-textural, thermal and mechanical properties", The Journal of Supercritical Fluids, 106, (2015); pp. 76-84.*
European Search Report for EP Patent Application No. 19169258.1, Issued on Sep. 17, 2019, 3 pages.
European Search Report for EP Patent Application No. 20163623.0, Issued on Jul. 16, 2020, 4 pages.
International Search Report for PCT Patent Application No. PCT/EP2020/060129, Issued on Jul. 21, 2020, 4 pages.
Lee, et al., "Polydicyclopentadiene based aerogel: a new insulation material", Journal of Sol-Gel Science and Technology, vol. 44, Jul. 19, 2007, pp. 29-40.
Lee, et al., "Polyurea based aerogel for a high performance thermal insulation material", Journal of Sol-Gel Science and Technology, vol. 49, Issue 2, Dec. 4, 2008, pp. 209-220.
Weigold, et al., "Correlation between mechanical stiffness and thermal transport along the solid framework of a uniaxially compressed polyurea aerogel", Journal of Non-Crystalline Solids, vol. 406. Dec. 15, 2014, pp. 73-78.

\* cited by examiner

*Primary Examiner* — Prashant J Khatri
(74) *Attorney, Agent, or Firm* — Grüneberg and Myers PLLC

(57) ABSTRACT

A molding based on a monolithic organic aerogel has a density in the range from 60 to 300 kg/m$^3$ and a thermal conductivity in the range from 12 to 17.8 mW/m*K. The molding based on a monolithic organic aerogel has more than 30 vol.-% of pores with a diameter of less than 150 nm, and more than 20 vol.-% of pores with a diameter of less than 27 nm, based on the total pore volume. A process can be used to prepare the molding by compression.

13 Claims, No Drawings

MOLDING BASED ON A MONOLITHIC ORGANIC AEROGEL

CROSS-REFERENCE TO RELATED APPLICATIONS

This application is the National Stage entry under § 371 of International Application No. PCT/EP2020/060129, filed on Apr. 9, 2020, and which claims the benefit of priority to European Application No. 19169258.1, filed on Apr. 15, 2019; and to European Application No. 20163623.0, filed on Mar. 17, 2020. The content of each of these applications is hereby incorporated by reference in its entirety.

BACKGROUND OF THE INVENTION

Field of the Invention

The present invention relates to a molding based on a monolithic organic aerogel having a density in the range from 100 to 300 kg/m$^3$ and a thermal conductivity in the range from 12 to 17.8 mW/m*K, a process for preparing the molding by compression of a molding based on a monolithic organic aerogel and a thermal insulation material comprising the molding in form of a sheet.

DESCRIPTION OF RELATED ART

Flexible polyurethane foams and melamine-formaldehyde foams have a thermal conductivity above about 30 milliwatt per mK, which is significantly higher compared to insulating sheets based on aerogels. Because of the higher thermal conductivity, the thermal isolation properties are inferior. Rigid polyurethane foams, however, are generally very brittle.

DE 10 2005 021 994 discloses a process for producing vacuum insulation panels by envelopment of a shaped body comprising open-celled foam, preferably a rigid polyurethane foam, with a gastight film and subsequent evacuation and gastight welding shut of the films wherein the shaped body comprising open-celled foam is compressed after curing and before evacuation.

Aerogel and xerogel based on polyisocyanate, which may be obtained by supercritical and non-supercritical drying, are disclosed in WO 95/02009 and WO 95/03358.

WO 96/37539 relates to polyisocyanate based aerogels and their method of preparation. The aerogels are produced by mixing an organic polyisocyanate, carbon black and catalyst in a solvent and enables preparation of filled polyisocyanate based organic aerogels of lower density than aerogels which do not include a filler.

US 2006/211840 A discloses polyurea aerogels as well as methods for preparing the same by mixing a polyisocyanate with a polyamine in a solvent and supercritically drying the resultant gel. Polyoxyalkyleneamine are a preferred type of the polyamines.

WO 2008/138978 discloses xerogels which comprise from 30 to 90% by weight of at least one polyfunctional isocyanate and from 10 to 70% by weight of at least one polyfunctional aromatic amine and have a volume average pore diameter of not more than 5 micrometer and its use for vacuum insulation panels. The thermal conductivity for an aerogel material with density of 170 kg/m$^3$ is above 37 mW/m*K at a pressure of 1004 mbar.

WO 2014/068105 relates to composite elements comprising a profile and an insulating core at least partially enclosed by the profile, wherein the insulating core consists of an organic porous material which has a thermal conductivity ranging from 13 to 30 mW/m*K, determined in accordance with DIN 12667, and a compressive strength of greater than 0.20 N/mm', determined in accordance with DIN 53421, to methods for producing such composite elements and to the use of such a composite element for producing windows, doors, refrigerating and/or freezing units and cabinets or facade-structure elements. The porous materials in the examples show thermal conductivities between 20 and 21 mW/m*K and densities of 110 to 153 g/l WO 2017/125414 and WO 2017/125415 relate to a process for producing isocyanate-based aerogels and xerogels with low density, sufficient mechanical stability and a low thermal conductivity at ambient pressure and their use as thermal insulation material or for vacuum insulation panels.

WO 2016/008726 relates to a process for preparing a porous material, at least providing a mixture (I) comprising a composition (A) comprising components suitable to form an organic gel and a solvent (B), reacting the components in the composition (A) in the presence of the solvent (B) to form a gel, and drying of the gel obtained in step b), wherein the composition (A) comprises a catalyst (C) selected from the group consisting of alkali metal and earth alkali metal salts of a saturated or unsaturated monocarboxylic acid with 4 to 8 carbon atoms.

Lee et al. describe in J Sol-gel Sci Technol (2009) 49 page 209-220 lightweight polyurea based organic aerogels via sol-gel processing and supercritical drying. Both shrinkage factors and thermal conductivity values (determined at 37.8° C.) of the polyurea based aerogels decrease with increasing target and the final density.

The mechanical stability and thermal conductivity of the matrix material of uniaxially compressed polyurea aerogel was determined as a function of density in Journal of Non-Crystalline Solids, 2014, 406, 73-78. Solid thermal conductivity rises as a function of density.

EP 2 615 132 discloses a material comprising aerogel particles and a polytetrafluoroethylene (PTFE) binder having a thermal conductivity of less than or equal to 25 mW/m K at atmospheric conditions. The material is moldable or formable, having little or no shedding or filler particles, and may be formed into structures such as tapes or composites, for example, by bonding the material between two outer layers. Advantageously, composites may be flexed, stretched, or bent without significant dusting or loss of insulating properties US 2014/0287641 discloses layered composites of aerogel materials and non-aerogel materials, such as fibrous sheet or laminated plies, including mechanically strong composites with multifunctional properties for various applications, such as insulation for garments, ballistic materials, space applications, lightweight structures for aircraft and automotive parts or sport equipment.

WO 2016/053399 discloses the production of highly durable, flexible fibre-reinforced aerogels with a thickness of less than 10 mm, which can be used as insulation in thermal battery applications. Preferably inorganic silica aerogels are applied to non-woven fiber reinforcement materials.

SUMMARY OF THE INVENTION

It was therefore an object of the invention to avoid the abovementioned disadvantages and to provide a molding based on a monolithic organic aerogel with low thermal conductivity at high densities, especially at densities above 100 kg/m$^3$. Furthermore, the molding should have sufficient compressive strength, high flexibility and should not be friable during handling. Furthermore, the process for producing the molding should be easy.

According to the present invention, this object was achieved by the molding based on a monolithic organic aerogel having a density in the range from 60 to 300 kg/m$^3$, a thermal conductivity in the range from 12 to 17.8 mW/m*K and more than 30 Vol.-% of pores with a diameter of less than 150 nm and more than 20 Vol.-% of pores with a diameter of less than 27 nm, based on the total pore volume.

DETAILED DESCRIPTION OF THE INVENTION

The molding based on a monolithic organic aerogel according to the invention has a density in the range from 60 to 300 kg/m$^3$, preferably in the range from 100 to 300 kg/m$^3$, more preferable in the range from 140 to 240 kg/m$^3$.

The thermal conductivity is in the range from 12 to 17.8 mW/m*K, preferable in the range from 15.5 to 17.0 mW/m*K, measured according to DIN EN 12667:2001-05 at 10° C. and 101 325 Pa.

The molding based on a monolithic organic aerogel according to the invention has more than 30 Vol.-% of pores (meso pores) with a diameter of less than 150 nm and more than 20 Vol.-% of pores with a diameter of less than 27 nm, based on the total pore volume. The fraction of pores with a diameter of 150 nm and higher (macro pores) is 70 Vol.-% or less.

Preferably the molding based on a monolithic organic aerogel according to the invention has in the range from 40 to 80 Vol.-% of pores (meso pores) with a diameter of less than 150 nm and in the range from 21 to 75 Vol.-% of pores with a diameter of less than 27 nm, based on the total pore volume. The fraction of pores with a diameter of 150 nm and higher (macro pores) is preferably in the range from 60 to 20 Vol.-%.

More preferably the molding based on a monolithic organic aerogel according to the invention has in the range from 50 to 80 Vol.-% of pores (meso pores) with a diameter of less than 150 nm and in the range from 40 to 75 Vol.-% of pores with a diameter of less than 27 nm, based on the total pore volume. The fraction of pores with a diameter of 150 nm and higher (macro pores) is more preferably in the range from 50 to 20 Vol.-%.

Most preferably the molding according to the invention has a density is in the range from 140 to 240 kg/m$^3$, a thermal conductivity is in the range from 15.5 to 17.0 mW/m*K and has in the range from 40 to 80 Vol.-% of pores with a diameter of less than 150 nm and in the range from 21 to 75 Vol.-% of pores with a diameter of less than 27 nm, based on the total pore volume.

The molding according to the invention preferably has an average pore size in the range between 1 to 150 nm.

The molding according to the invention preferably has a compression strength in the range from 600-700 kPa. The flexural strength is preferable in the range from 1000-5000 KPa, more preferable in the range from 1000-2500 KPa, as determined according to DIN EN 12089:2013-06. The bending is preferably in the range from 10-20 mm.

The molding according to the present invention may have various sizes and shapes depending on the molding tools selected. The molding may be in the form of blocks or sheets. Preferable the molding is in the form of a sheet with a thickness in the range from 100 µm to 10 mm, more preferably in the range from 3 to 10 mm.

The molding according to the present invention may have a certain surface texture depending on the molding tools selected.

Aerogels are porous materials, which are obtainable by pouring a sol in a molding followed by drying through solvent exchange with supercritical carbon dioxide (scCO2). Preferred aerogels are based on polyurethanes (PU) or polyurea (PUR). The organic Aerogel is preferable a monolithic aerogel based on polyurethane (PU), polyurea or polyisocyanurate (PIR) or mixtures thereof. Preferably the organic aerogel has less than 80%, more preferably less than 50% of polyisocyanurate (PIR) structures, based on the total of PU-, PUR- and PIR-structures. The amount of PU-, PUR- and PIR-structures may be determined by infrared (IR) spectroscopy. Preferred aerogels may be produced by reacting a mixture (A) comprising at least one polyfunctional isocyanate (a1), at least one aromatic amine (a2), and at least a catalyst (a3) in the presence of a solvent (B) to form a gel and drying the gel obtained under supercritical conditions, as described in more detail below.

Sheet or moldings of highly crosslinked organic aerogels and xerogels are generally nonflexible. They can be converted to thinner sheets or moldings by non-destructive compression without lateral deformation performed in a hydraulic or pneumatic press. Due to higher density the compressed sheets or moldings show better mechanical properties. Surprisingly the thermal conductivity is additionally significantly lower compared with sheets or moldings with comparable density, which were not compressed. Compressed sheets or molding show lower material loss in the friability test.

The present invention is further directed to a process for preparing a molding as described above, which comprises compressing a molding based on an organic aerogel with a density in the range from 50 to 140 kg/m, preferably in the range from 80 to 140 kg/m$^3$ with a compression factor in the range from 5 to 70 Vol.-% to obtain a molding based on a monolithic organic aerogel having a density in the range from 60 to 300 kg/m$^3$, preferably in the range from 100 to 300 kg/m$^3$, more preferable in the range from 140 to 240 kg/m$^3$. Preferably the compression factor is in the range from 30 to 50 Vol.-%.

A preferred process comprises compressing a molding based on an organic aerogel in the form of a sheet unidirectional in the direction of the thickness of the sheet.

The compression may be performed in a hydraulic or pneumatic press. Preferably the temperature of the molding is between 10 and 80° C. The pressure applied is preferably in the range from 0.12-10 MPa/1000 cm$^2$. During compression a tool, i.e. a tool with a logo, may be used to emboss the logo on the surface of the sheet.

Before compression the organic aerogel sheet or molding has a homogeneous nanoporous structure with an average pore size in the range from 10 to 1000 nm and shows a thermal conductivity in the range from 18 to 20 mW/m*K and a density from 80 to 140 kg/m$^3$. Such aerogel sheets or moldings can be produced i.e. as described in WO 2017/125414.

After compression the aerogel sheet or molding is more flexible and has a lower thermal conductivity. The thermal conductivity of the sheet or molding is preferably 17.8 mW/m*K or below, more preferably in the range from 15.5 to 17.0 mW/m*K at a density between 100-300 kg/m$^3$, preferably between 140 and 240 kg/m$^3$. The average pore size after compression is preferably in the range between 1 to 100 nm.

A further preferred process for preparing a molding as described above, comprises the steps of
  a) reacting a mixture (A) comprising at least one polyfunctional isocyanate (a1), at least one aromatic amine (a2), and at least a catalyst (a3) in the presence of a solvent (B) to form a gel,
  b) drying the gel obtained in step b) under supercritical conditions,
  c) optionally cutting the dried gel into sheets with a thickness in the range from 0.1 to 10 mm, and
  d) and compressing the dried gel to a density in the range from 100 to 300 kg/m$^3$.

Possible polyfunctional isocyanates are aromatic, aliphatic, cycloaliphatic and/or araliphatic isocyanates with two or more isocyanate groups per molecule.

As polyfunctional isocyanates (a1), preference is given to aromatic isocyanates. Particularly preferred polyfunctional isocyanates of the component (a1) are the following embodiments:
  (i) polyfunctional isocyanates based on tolylene diisocyanate (TDI), in particular 2,4-TDI or 2,6-TDI or mixtures of 2,4- and 2,6-TDI;
  (ii) polyfunctional isocyanates based on diphenylmethane diisocyanate (MDI), in particular 2,2'-MDI or 2,4'-MDI or 4,4'-MDI or oligomeric MDI, also referred to as polyphenylpolymethylene isocyanate, or mixtures of two or three of the abovementioned diphenylmethane diisocyanates or crude MDI which is obtained in the production of MDI or mixtures of at least one oligomer of MDI and at least one of the abovementioned low molecular weight MDI derivatives;
  (iii) mixtures of at least one aromatic isocyanate according to embodiment i) and at least one aromatic isocyanate according to embodiment ii).

Preferably, the aromatic amine (a2) is a polyfunctional aromatic amine.

The amines (a2) are preferably selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions can be identical or different and are each selected independently from among linear or branched alkyl groups which have from 1 to 12 carbon atoms and can bear further functional groups. The abovementioned alkyl groups are preferably methyl, ethyl, n-propyl, i-propyl, n-butyl, sec-butyl or t-butyl (in each case unsubstituted).

Composition (A) preferably further comprises at least one monool (am). In principle, any monool can be used in the context of the present invention. It is also possible according to the present invention that the composition (A) comprises two or more monools. The monool can be branched or linear. Primary, secondary or tertiary alcohols are suitable according to the present invention. Preferably, the monool (am) is a linear alcohol, more preferred a linear primary alcohol. The monool can be an aliphatic monool or an aromatic monool in the context of the present invention. Furthermore, the monool can also contain further functional groups as long as these do not react with the other components under the conditions of the process according to the present invention. The monool may for example contain C—C double bonds or C—C triple bonds.

The monool can for example be a halogenated monool, in particular a fluorinated monool such as a polyfluorinated monool or a perfluorinated monool.

According to a further embodiment, the present invention therefore is directed to the process for preparing a porous material as disclosed above, wherein the composition (A) comprises at least one monool (am).

The catalyst (a3) is preferably selected from the group consisting of dimethylcyclohexylamine, bis(2-dimethylaminoethyl) ether, N, N, N, N, N-pentamethyldiethylenetriamine, methylimidazole, dimethylimidazole, aminopropylimidazole, dimethylbenzylamine, 1,6-diazabicyclo[5.4.0]undec-7-ene, trisdimethylaminopropylhexahydrotriazine, triethylamine, tris(dimethylaminomethyl)phenol, triethylenediamine (diazabicyclo[2.2.2]octane), dimethylaminoethanolamine, dimethylaminopropylamine, N, N-dimethylaminoethoxyethanol, N,N,N-trimethylaminoethylethanolamine, triethanolamine, diethanolamine, triisopropanolamine, diisopropanolamine, methyldiethanolamine, butyldiethanolamine, metal acetylacetonates, ammonium carboxylates, and metal carboxylates such as acetates, propionates, sorbates, ethylhexanoates, octanoates, benzoates and citrates, ammonium phosphates and metal phosphates.

Composition (A) can further comprise at least one flame retardant (af). According to the present invention, compound (af) comprises phosphorous and at least one functional group which is reactive towards isocyanates. According to the present invention, the phosphorous can be present in the compound (af) in the form of a functional group comprising phosphorous or in any other part of the molecule, for example in the backbone of the molecule. The compound (af) further comprises at least one functional group which is reactive towards isocyanates. Compound (af) may also comprise two or more functional groups which are reactive towards isocyanates, in particular two groups which are reactive towards isocyanates. Typically, according to the present invention compound (af) is used in an amount which results in a phosphorous content in the porous material in a range of from 1 to 5% by weight.

Suitable functional groups which are reactive towards isocyanates are for example hydroxyl or amine groups. It is also possible in the context of the present invention, that composition (A) comprises two or more different compounds (af). Composition (A) may for example comprise one compound (af) which comprises phosphorous and at least one functional group which is reactive towards isocyanates and a second compound (af) which comprises phosphorous and at least two functional groups which are reactive towards isocyanates.

Suitable functional groups comprising phosphorous are known to the person skilled in the art. The functional group comprising phosphorous may for example be selected from the group consisting of phosphates, phosphonates, phosphinates, phosphites, phosphonites, phosphinites, and phosphine oxides. Thus, according to a further embodiment, the present invention is directed to the process for preparing a porous material as disclosed above, wherein the compound (af) comprises at least one functional group comprising phosphorous selected from the group consisting of phosphates, phosphonates, phosphinates, phosphites, phosphonites, phosphinites, and phosphine oxides.

Composition (A) preferably further comprises at least one polyol (ap). In principle, any polyol can be used in the context of the present invention. It is also possible according to the present invention that the composition (A) comprises two or more polyols. The polyol can be branched or linear. Primary, secondary or tertiary alcohols are suitable according to the present invention. Preferably, the polyol (ap) is a linear diol, more preferred a linear primary diol. The polyol can be an aliphatic polyol or an aromatic polyol in the context of the present invention. Furthermore, the polyol can also contain further functional groups as long as these do not react with the other components under the conditions of the process according to the present invention. The polyol may for example contain C—C— double bonds or C—C triple bonds. The polyol can for example be a halogenated polyol, in particular a fluorinated polyol such as a polyfluorinated polyol.

In the context of the present invention, the polyol may also be chosen from allyl alcohols, alkylphenols, or propargyl alcohols. Furthermore, alkoxylates can be used in the context of the present invention such as fatty alcohol alkoxylates, oxo alcohol alkoxylates, or alkyl phenol alkoxylates.

According to a further preferred embodiment, the polyol is selected from aliphatic or aromatic polyols with 1 to 20 carbon atoms. Suitable primary polyols are for example linear alcohols such as ethylene glycol, diethylene glycol, triethylene glycol, tetraethylene glycol, propanediols, butanediols, pentanediols, hexanediols, heptanediols or octanediols. Other examples are a polyoxyalkylene, a polyoxyalkenyl, a polyester diol, a polyesterol, a polyether glycol, especially a polypropylene glycol, a polyethylene glycol, a polypropylene glycol, a polypropylene ethylene glycol.

Suitable branched primary polyols are for example glycerol and trimethylolpropane. Mixtures of polyols can be used. A mixture can be understood as meaning for example a copolymer, but also a mixture of polymeric or non-polymeric polyols.

Generally, the amount of polyol present in the composition (A) can vary in wide ranges. Preferably, the polyol is present in the composition (A) in an amount of from 0.1 to 30% by weight based on the composition (A), more preferable in an amount of from 0.5 to 25% by weight based on the composition (A), in particular in an amount of from 1.0 to 22% by weight based on the composition (A), for example in an amount of from 1.5 to 20% by weight based on the composition (A).

Possible solvents (B) are, for example, ketones, aldehydes, alkyl alkanoates, amides such as formamide, N-methylpyrollidone, N-ethylpyrollidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are likewise possible. Aldehydes and/or ketones are particularly preferred as solvent (B). Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanoacetaldehyde, ethyl glyoxylate, benzaldehyde, acetone, diethyl ketone, methyl ethyl ketone, methyl isobutyl ketone, methyl n-butyl ketone, methyl pentylketone, dipropyl ketone, ethyl isopropyl ketone, ethyl butyl ketone, diisobutylketone, 5-methyl-2-acetyl furan, 2-acetylfuran, 2-methoxy-4-methylpentan-2-one, 5-methylheptan-3-one, 2-heptanone, octanone, cyclohexanone, cyclopentanone, and acetophenone. The abovementioned aldehydes and ketones can also be used in the form of mixtures. Ketones and aldehydes having alkyl groups having up to 3 carbon atoms per substituent are preferred as solvent (B).

The components of mixture (A), for example the components (a1) and (a2) are preferably provided separately from one another, each in a suitable partial amount of the solvent (B). The separate provision makes it possible for the gelling reaction to be optimally monitored or controlled before and during mixing.

The gelling formation in step a) is a polyaddition reaction, in particular a polyaddition of isocyanate groups and amino groups. For the purposes of the present invention, a gel is a crosslinked system based on a polymer which is present in contact with a liquid (known as solvogel or lyogel, or with water as liquid: aquagel or hydrogel). Here, the polymer phase forms a continuous three-dimensional network.

Drying of the gel in step b) is carried out under supercritical conditions, preferably after replacement of the solvent by $CO_2$ or other solvents suitable for the purposes of supercritical drying. Such drying is known per se to a person skilled in the art. Supercritical conditions characterize a temperature and a pressure at which $CO_2$ or any solvent used for removal of the gelation solvent is present in the supercritical state. In this way, shrinkage of the gel body on removal of the solvent can be reduced.

The compression in step c) may be performed in a hydraulic or pneumatic press. Preferably the temperature of the molding is between 10 and 80° C. The pressure applied is preferably in the range from 0.12-10 MPa/1000 $cm^2$.

The process according to the present invention allows to produce moldings or sheets of organic aerogels with different shapes and thickness, i.e. wedges, by using different tools and/or pressure.

A coating or laminate may be applied to the sheet or molding before or after compression. The sheet or molding may be embossed during compression by using embossing tools. Logos, ornaments or patters may thus be applied to the surface of the sheet or molding.

Flexible products may be obtained by applying a coating or flexible layer on the surface of the molding based on a monolithic organic aerogel as described above. The flexible layer may be a thermoplastic polymer, or a thermoplastic polymer reinforced with organic or inorganic fibers or woven or non-woven fabrics. The coating or flexible layer may be modified with additives to impart functionalities, such as electrical conductivity or flame retardancy. Preferably the cover layer C) is a polymer film, more preferably a transparent polypropylene film.

A further subject of the present invention is therefore a thermal insulation material comprising a molding based on a monolithic organic aerogel in form of a sheet as layer A) and at least one coating or cover layer C). Preferably the thickness of the layer A) is in the range from 0.99 to 1.99 mm, more preferably in the range from 0.25 to 1.45 mm. The thickness of the at least one coating or cover layer C) is in the range from 0.01 to 1 mm, more preferably in the range from 0.05 to 0.5 mm.

Further functional layers F) may be included between layers A) and between layers A) and C). The functional layers F) are preferably selected from an electrically insulating or conducting layer, a flame-retardant layer or a heat spreader layer. Several functions can be integrated into one layer F).

The layers may be attached to each other by heat, pressure or chemical bonding. Preferably the layers are connected by adhesives. The adhesive may be applied as spots, stripes or other patterns or as a separate adhesive layer (B). Preferably the thermal insulation material consists of one layer A) and one or two layers C), which are attached by an adhesive layer B) resulting in the layer structure A-B-C and C-B-A-B-C respectively.

To facilitate the application of the thermal insulation material a further adhesive layer B) may be applied to the outside of the cover layer C) resulting in the structures A-B-C-B and C-B-A-B-C-B.

In the thermal insulation material each layer A), B), C) and F) have different chemical compositions but may have similar functionalities, such as flame retardancy beside their main function.

Preferably the thickness of the thermal insulation material is in the range from 0.3 to 2.5 mm. For applications where a very thin thermal insulation material in form of tape or foil is desired, preferably only layers A), B) and C) are present. A thermal insulation material consisting of one layer A), one layer B) and one cover layer C) is particularly preferred for very thin thermal insulation tapes or foils.

A thermal insulation material consisting of one layer A) and two cover layers C) attached by adhesive layers B) with the layer structure C-B-A-B-C is preferred, if thermal insulation tapes with higher flexibility are advantageous.

Preferably the at least one layer A has a thickness in the range from 0.09 to 4.49 mm, more preferably in the range from 0.25 to 2.45 mm.

The at least one cover layer C) preferably has a thickness in the range from 0.01 to 2.5 mm, more preferably in the range from 0.05 to 1.0 mm, most preferably in the range from 0.05 to 0.5 mm.

Preferably the thickness of the sum of all layers A) is 50% to 99.9%, more preferably 90% to 99% of the total thickness of the thermal insulation material.

Layer B)

For the adhesive layer any suitable adhesive, such as polyurethanes, acrylates, epoxy, silicate or silicone may be used. The adhesive layer B) may comprise additives, such as carbon powder, glass fiber or powder or flame retardants.

The adhesive layer may be applied directly onto one or both sides of any layer, preferably to the cover layer C) or functional layer F). Preferably layer C) is used in form of a hybrid tape CB) consisting of a cover layer C) and an adhesive layer B) or a hybride tape CFB consisting of a cover layer C), a functional layer F) and an adhesive layer B). The hybrid layer can then be attached to one or both sides of an aerogel layer A) to build the thermal insulation material Layer C)

Layer C) is chemically different from layer A) and/or has different mechanical properties. Layer C) preferably has a higher mechanical flexibility compared with aerogel layer A). Flexible products may be obtained by applying a coating or flexible cover layer C) on the surface of the molding based on a monolithic organic aerogel as described above. The flexible cover layer C) may be a thermoplastic polymer, or a thermoplastic polymer reinforced with organic or inorganic fibers or woven or non-woven fabrics. Further materials suitable as flexible cover layer are a graphite or graphene film, a metal film, or a ceramic film, such as a hydroxyapatite film or glass fiber paper. The coating or flexible layer C) may be modified with additives to impart functionalities, such as electrical conductivity or insulation or flame retardancy. Preferably the cover layer C) is a polymer film, a graphite or graphene film, a metal film, or a ceramic film, such as a hydroxyapatite film or a mineral fleece. More preferably a thermoplastic polymer film, such as transparent polyethylene, polypropylene or polyterephthalate film or a mineral fleece.

Layer F)

The functional Layer F) is optionally used in the thermal insulation material and is preferably an electrically conducting or insulating layer, a flame-retardant layer, a heat spreader layer. The functional layer F) may be applied as separate layer, preferably between layer A) and C) or as a hybrid tape CF or CBF comprising a layer C) attached to a functional layer F), optionally by an adhesive layer B).

A further subject of the present invention is therefore a thermal insulation material comprising a molding based on a monolithic organic aerogel in form of a sheet as layer A) and at least one coating or cover layer C). Preferably the thickness of the layer A) is in the range from 0.09 to 4.49 mm, more preferably in the range from 0.25 to 2.45 mm. The thickness of the at least one coating or cover layer C) is in the range from 0.01 to 2.5 mm, more preferably in the range from 0.05 to 1.0 mm.

Preferably the laminated sheet comprises an adhesive tape attached on all or part of the surface of a layer A) of a monolithic aerogel, based on polyurethanes (PU), polyurea (PUR), polyisocyanurate (PIR) or mixtures thereof. Preferably, layers C comprises an adhesive layer facing the outside for facile attachment to other parts.

The thermal insulation material may be adapted to various forms by thermoforming or rolling to cylinders with diameter as low as 3 mm. The thermal insulation material may be cut to the desired shape easily with common tools such as scissors or saws.

Preferably the thermal insulation material comprises an adhesive tape as layer C) attached on all or part of the surface of a layer A) of a monolithic aerogel, based on polyurethanes (PU), polyurea (PUR), polyisocyanurate (PIR) or mixtures thereof.

The thermal insulation material may be adapted to various forms by thermoforming or rolling to cylinders with diameter as low as 10 mm.

A further subject of the invention is a process for preparing a thermal insulation material a comprising the steps of
a) reacting a mixture (A) comprising at least one polyfunctional isocyanate (a1), at least one aromatic amine (a2), and at least a catalyst (a3) in the presence of a solvent (B) to form a gel,
b) drying the gel obtained in step b) under supercritical conditions to form a monolithic aerogel),
c) optionally cutting the dried gel into sheets with a thickness in the range from 0.99 to 1.99 mm,
d) compressing the monolithic aerogel from step b) to a density in the range from 100 to 300 kg/m$^3$ to obtain a layer A),
e) applying at least one cover layer C) optionally by an adhesive layer B) to the layer A) obtained in step c).

The molding according to the invention show a low thermal conductivity and therefore good thermal insulation properties at high densities. At the same time the molding is mechanically stable and shows a high compression and bending strength During handling it is less friable.

The compression step in the process according to the invention changes the pore structure of the monolithic organic aerogel molding to a pore structure with a higher volume fraction of mesopores with pore diameters less than 150 nm and less than 27 nm.

The molding and the thermal insulation material according to the invention are suitable for use in construction and refrigeration appliance industry or for the use in electronic devices as well as batteries, preferably as thermal insulation material for interior insulation, shutter box, window fanning, refrigerators, electronic devices, smart phones, tablets, notebooks or rechargeable batteries.

EXAMPLES

Methods:

The thermal conductivity was measured according to DIN EN 12667:2001-05 with a heat flow meter from Hesto (Lambda Control A50) at 10° C. In the case of laminated and non-laminated sheets of 1-2 mm thickness, stacks of up to 9 sheets (15 cm*15 cm) were measured.

The compressive strength was determined according to DIN EN ISO 844:2014-11 with 6% strain.

Flexural strength was determined with three-point bending test according to DIN EN 12089:2013-06. Holding points were spaced 50 mm apart. Maximum bending radius was 90°. Sample dimension was ca. 100×20 mm. Samples laminated on one side were pressed on laminated side.

Friability was determined with a tumbling friability test according to ASTM C 421-77 with samples of 25×25 mm length and width and a thickness as reported in Table 4.

Pore volume was measured according to DIN 66134:1998-02 using a Nova 4000e pore size analyzer from Quantachrome Instruments. Approximately 15-20 mg of the samples were broken off from the original sample and placed in a measuring glass cell. The samples were degassed under 50 mm Hg vacuum and 60° C. for 15 h to remove any adsorbed components on the sample. The samples were weighed again prior to the surface area and pore size analysis.

Surface area measurements: Specific surface area was determined by Brunauer-Emmet-Teller (BET) method using low-temperature nitrogen adsorption analysis (at the boiling point of nitrogen, 77K) between the IUPAC recommended P/P0 range (0.05-0.30). The $1/((w·(P0/P-1)))$ vs P/P0 graph yielded linear plot with correlation coefficients (r) above 0.999.

Pore size distribution: A low temperature nitrogen adsorption-desorption curve was determined in the P/P0 range (0.05-0.99). The pore size distribution was determined using the Barret-Joyner-Halenda (BJH method) which using the Kelvin model of pore filling for a given pore size. The theoretical maximum pore diameter measurable by this method is 190 nm.

Pore volume (occupied by pores less than 190 nm): The total mesopore volume was determined from the total volume (vads) of nitrogen adsorbed (at S.T.P conditions) on the pores at P/P0=0.99 and subsequently multiplying this value with a conversion factor that provides the value of liquid nitrogen filled inside the pores.

The total pore volume of the monolithic organic aerogel samples was calculated as difference of the specific volume of the sample and the specific volume of the solid polymer (skeletal volume). The specific volume of the solid polymer may be determined by pycnometry according to ISO 12154:2014-04. In the examples the specific volume of the isocyanate-based polymer was 0.65 $cm^3/g$.

Materials:
M200 oligomeric MDI (Lupranat M200) having an NCO content of 30.9 g per 100 g accordance with ASTM D-5155-96 A, a functionality in the region of three and a viscosity of 2100 mPa·s at 25° C. in accordance with DIN 53018.
MDEA 3,3',5,5'-Tetraethyl-4,4'-diaminodiphenylmethane
MEK Methylethylketone
Ksorbate Potassium sorbate dissolved in monoethylene glycol (5%) solution
TBA citrate Tetrabutyl ammonium citrate (25 wt.-% in MEG)
Exolit OP560 Phosphorous polyol Transparent Tape (CB1):
Ca. 0.06 mm thick transparent PP tape (width 5 cm) with contact adhesive (Enviropack® e-Tape)
Textile-Reinforced Tape (CB2):
Ca. 0.3 mm thick polymer tape (width 5 cm) with textile reinforcement and contact adhesive (Tesa® 4651 white)
Paper (CB3):
Office paper 80 g/m2 with a manually applied layer of glue-stick adhesive (Pritt® original glue stick)
Graphite Foil (CFB4):
Ca. 25 µm thick graphite foil with 10 µm electrically isolating polymer layer and contact adhesive (heat-spreader foil from ProGraphite)
Aluminum-Coated Paper (CFB5):
Ca. 0.3 mm thick aluminum-coated paper with contact adhesive
Mineral Fleece (CFB6):
Ca. 0.6 mm thick, fire-resistant mineral fleece (Innobra MIV 520 P) with a manually applied layer of glue-stick adhesive (Pritt® original glue stick)

Example 1

In a polypropylene container, 48 g M200 were stirred in 220 g MEK at 20° C. leading to a clear solution. Similarly, 8 g MDEA, 2 g Ksorbate solution (5% in MEG), 2 g Exolit OP560 and 4 g Butanol were dissolved in 220 g MEK to obtain a second solution. The solutions were combined in a rectangular container (20×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO2 in a 25 l autoclave leading to a porous material.

The obtained porous plates were compressed for 2 seconds using a hydraulic press (Schmidt Maschinentechnik) with press plates (30×30 cm) at 25° C. with a pressure in the range of 30-60 kN/900 $cm^2$ and a press speed of 22.8 cm/min (Examples 1-1, 1-2).

A wrench was placed on top of the porous plate of example 1-C and compressed. The wrench was afterwards embossed with its logo on the surface of the plate.

Example 2

In a polypropylene container, 25.6 g M200 were stirred in 146.67 g MEK at 20° C. leading to a clear solution. Similarly, 5.33 g MDEA, 1.33 g Ksorbate solution (5% in MEG), 1.33 g Exolit OP560 and 2.67 g Butanol were dissolved in 146.67 g MEK to obtain a second solution. The solutions were combined in a rectangular container (16×16 cm×3 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO2 in a 25 l autoclave leading to a porous material.

The obtained porous plates were compressed for 2 seconds using a hydraulic press (Schmidt Maschinentechnik) with press plates (30×30 cm) at 25° C. with a pressure in the range of 30-60 kN/900 $cm^2$ and a press speed of 22.8 cm/min (Examples 2-1, 2-2, 2-3, 2-4).

Example 3-C

In a polypropylene container, 22.4 g M200 were stirred in 121.6 g MEK at 20° C. leading to a clear solution. Similarly, 5.33 g MDEA, 1.33 g Ksorbate solution (5% in MEG), 1.33 g Exolit OP560 and 2.67 g Butanol were dissolved in 121.6 g MEK to obtain a second solution. The solutions were combined in a rectangular container (16×16 cm×3 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

Example 4-C

In a polypropylene container, 22.4 g M200 were stirred in 96.8 g MEK at 20° C. leading to a clear solution. Similarly, 5.33 g MDEA, 1.33 g Ksorbate solution (5% in MEG), 1.33 g Exolit OP560 and 2.67 g Butanol were dissolved in 96.8 g MEK to obtain a second solution. The solutions were combined in a rectangular container (16×16 cm×3 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO2 in a 25 l autoclave leading to a porous material.

Example 5-C

In a polypropylene container, 22.4 g M200 were stirred in 54.3 g MEK at 20° C. leading to a clear solution. Similarly, 5.33 g MDEA, 1.33 g Ksorbate solution (5% in MEG), 1.33 g Exolit OP560 and 2.67 g Butanol were dissolved in 54.3 g MEK to obtain a second solution. The solutions were combined in a rectangular container (16×16 cm×3 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

The results are summarized in table 1. The compressed porous plates show a significant lower thermal conductivity and a higher flexural strength at higher density.

Example 6

Preparation of Compressed Monolithic Aerogel Layer A1:

In a polypropylene container, 48 g M200 were stirred in 220 g MEK at 20° C. leading to a clear solution. Similarly, 6 g MDEA, 2 g Ksorbate solution, 2 g Exolit OP560 and 6 g Butanol were dissolved in 220 g MEK to obtain a second solution. The solutions were combined in a rectangular container (20 cm×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO$_2$ in a 25 l autoclave leading to a porous material.

A slab of the porous material of 15×15×1.5 cm was cut to sheets of 15×15 cm and 1-3 mm thickness using a band saw.
Preparation of Compressed Monolithic Aerogel Layer A2:

Porous plates obtained as described above for the monolithic aerogel layer A1 were compressed for 2 seconds using a hydraulic press (Schmidt Maschinentechnik) with press plates (30×30 cm) at 25° C. with a pressure in the range of 30-60 kN/900 cm$^2$ and a press speed of 20-25 cm/min. In Table 1 the thickness reduction is listed as compression in %.

Examples 6-1 to 6-11

Pre-cut strips of adhesive tape (CB1), textile tape (CB2), paper with a layer of glue-stick adhesive (CB3), graphite foil (CFB4), aluminum coated paper (CFB5) or mineral fleece with a layer of glue-stick adhesive (CFB6) were pressed manually with the adhesive layer onto a sheet of monolithic aerogel layer A1 and A2. In the case of CB1 and CB2, for samples of 5 cm width or less, one layer of tape was used per side. In case of samples with more than 5 cm width, tape layers were applied in such a way as to cause an overlap of ca. 5-10 mm between layers. The laminate structure, thickness and mechanical properties of the thermal insulation material are summarized in Table 1.

Examples 6-3 to 6-7, 6-8, 6-10 and 6-11 show no delamination in three-point-bending test, if bent with tape layer on outside no delamination occurs. Minimum diameter is the diameter without visible damage when bent or rolled. In case of sheets with lamination on one side the sheet was bent over the side without cover layer. Sheets are considered not reusable, if the material breaks and/or partial delamination occurs after bending to minimum rolling diameter.

The results are summarized in table 2.

Example 7

In a polypropylene container, 48 g M200 were stirred in 220 g MEK at 20° C. leading to a clear solution. Similarly, 8 g MDEA, 2 g Ksorbate solution (5% in MEG), 2 g Exolit OP560 and 4 g 1-butanol were dissolved in 220 g MEK to obtain a second solution. The solutions were combined in a rectangular container (20×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO2 in a 25 l autoclave leading to a porous material.

The obtained porous plates were compressed for 2 seconds using a hydraulic press (Schmidt Maschinentechnik) with press plates (30×30 cm) at 25° C. with a pressure in the range of 30-60 kN/900 cm$^2$ and a press speed of 22.8 cm/min (Examples 7-C to 7.4). The results are summarized in table 3.

Example 8

In a polypropylene container, 25.6 g M200 were stirred in 220 g MEK at 20° C. leading to a clear solution. Similarly, 5.44 g MDEA, 0.67 g TBA-Citrat solution (25% in MEG), 1 g Exolit OP560 and 2.67 g 1-butanol were dissolved in 220 g MEK to obtain a second solution. The solutions were combined in a rectangular container (20×20 cm×5 cm height) by pouring one solution into the other, which led to a homogeneous mixture of low viscosity. The container was closed with a lid and the mixture was gelled at room temperature for 24 h. The resulting monolithic gel slab was dried through solvent extraction with scCO2 in a 25 l autoclave leading to a porous material.

The obtained porous plates were compressed for 2 seconds using a hydraulic press (Schmidt Maschinentechnik) with press plates (30×30 cm) at 25° C. with a pressure in the range of 30-60 kN/900 cm² and a press speed of 22.8 cm/min (Examples 8-C to 8.4). The results are summarized in table 3.

Examples 9-12

Example 9 was repeated with different amounts and concentrations of raw materials as shown in Table 5 to obtain monolithic aerogel samples with different densities and thickness.

The obtained porous plates were compressed for 2 seconds using a hydraulic press (Schmidt Maschinentechnik) with press plates (30×30 cm) at 25° C. with a pressure in the range of 30-60 kN/900 cm² and a press speed of 22.8 cm/min to obtain compressed plates with thickness about 8 mm. The results are summarized in table 4.

Example 11-4 shows a mass loss of 0.3 wt.-% in the friability test, which is much lower than the mass loss of 1.7 wt.-% for comparative Example 10-C.

Examples 13 and 14

All steps were carried out at 20° C. Examples 13 (1 wt.-% alginate) and 14 (2 wt.-% alginate) were prepared by adding 28 g (13) or 56 g (14) sodium alginate to 2500 g water in a beaker and stirring overnight with a laboratory stirrer. Afterwards, 8.2 g (13) or 16.3 g (14) calcium carbonate powder were dispersed in water using a rotor-stator mixer, and the obtained dispersion was immediately added to the alginate solution while stirring. 6.8 g (13) or 13.6 g (14) D-glucono-δ-lactone (GDL) were dissolved in 66.7 g water by stirring intensely for 10 s, and the resulting solution was then added to 750 g of the alginate/calcium carbonate mixture followed by stirring of the resulting mixture for 30 s. The mixture was immediately poured into polymer molds of 20×20 cm to a height of 10-15 mm, and the filled molds were left for gelation of the mixture overnight. The liquid expelled from the gel during gelation was removed every 2-6 h. The obtained gel slabs were aged in 750 g of a previously prepared calcium chloride solution (15 g calcium chloride in 2975 g water) for 24 h. The gel liquid was exchanged from aqueous solution to ethanol by placing the gel slab for 24 h each in 750 g of 20 vol.-%, 40 vol.-%, 60 vol.-%, 80 vol.-% ethanol in water and finally pure ethanol for 24 h. The gel slabs were dried using supercritical carbon dioxide to obtain alginate porous plates.

The obtained porous plates were compressed for 2 seconds using a hydraulic press (Schmidt Maschinentechnik) with press plates (30×30 cm) at 25° C. with a pressure in the range of 30-60 kN/900 cm² and a press speed of 22.8 cm/min to obtain compressed plates with thickness about 8 mm. The results are summarized in table 4.

TABLE 1

Physical and mechanical properties of Examples 1 to 5

| Example | Compression [% of original thickness] | Thickness [mm] | Density [kg/m³] | Thermal conductivity [mW/m*K] (p = 1 bar, T = 10° C.) | Compressive strength [kPa] | Flexural strength [kPa] | Bending [mm] | Pressure [kN] |
|---|---|---|---|---|---|---|---|---|
| 1-C | 0 | 13.1 | 125 | 18.5 | 506 | 700 | 7.8 | |
| 1-1 | 28 | 9.4 | 181 | 16.9 | 613 | 1280 | 12 | |
| 1-2 | 42 | 7.6 | 237 | 17.0 | 668 | 2470 | 18.6 | |
| 2-C | 0 | 14.9 | 97 | 19.0 | | | | |
| 2-1 | 15 | 12.6 | 114 | 17.5 | | | | 30 |
| 2-2 | 32 | 10.1 | 143 | 16.2 | | | | 31 |
| 2-3 | 51 | 7.3 | 198 | 15.9 | | | | 36 |
| 2-4 | 62 | 5.6 | 258 | 17.6 | | 4370 | 10.1 | 58 |
| 3-C | 0 | 12.3 | 108 | 18.7 | | 680 | 4.9 | |
| 4-C | 0 | 10 | 130 | 18.5 | | 1250 | 6.6 | |
| 5-C | 0 | 6.2 | 216 | 22.2 | | 4240 | 9.8 | |

TABLE 2

Properties of laminated sheets of Example 6

| Example | Laminate structure | Layer A Compressed by | Thickness laminated sheet ca. [mm] | Thermal conductivity [mW/m*K] | Max. bending strength [kPa] | Bending at max. bending strength [mm] | Bending strength at 10 mm bending [kPa] | Bending strength at 20 mm bending [kPa] | Bending to 90° without breaking | Delamination | Min. diameter when bent/rolled [mm] | Reusable after bending to min. rolling diameter |
|---|---|---|---|---|---|---|---|---|---|---|---|---|
| 6C-1 | A1 | 0% | 0.9 | 19.4 | — | — | — | — | — | — | Breaks at 50 | No |
| 6C-2 | A2 | 33% | 1.0 | 16.7 | 2300 | 11 | 3200 | Breaks | No | — | Breaks at 50 | No |
| 6-1 | CB1/A1 | 0% | 0.9 | 20.3 | — | — | — | — | — | — | — | — |
| 6-2 | CB1/A1/CB1 | 0% | 1.0 | 21.0 | — | — | — | — | — | — | — | — |
| 6-3 | CB1/A2 | 33% | 1.1 | 17.8 | 3300 | 11 | 3200 | Breaks | No | No | 10 | No |
| 6-4 | CB1/A2/CB1 | 33% | 1.2 | 18.2 | 5300 | 11 | 5300 | 3900 | Yes | No | 10 | Yes |
| 6-5 | CB2/A2 | 33% | 1.3 | — | 2600 | 9 | 2800 | Breaks | No | No | 5 | No |
| 6-6 | CB2/A2/CB2 | 33% | 1.6 | — | 5500 | 13 | 5300 | 4700 | Yes | No | 5 | Yes |
| 6-7 | CB3/A2/CB3 | 33% | 1.3 | — | 11500 | 9 | 8100 | 6800 | Yes | Very little | 10 | No |

TABLE 2-continued

Properties of laminated sheets of Example 6

| Example | Laminate structure | Layer A Compressed by | Thickness laminated sheet ca. [mm] | Thermal conductivity [mW/m*K] | Max. bending strength [kPa] | Bending at max. bending strength [mm] | Bending strength at 10 mm bending [kPa] | Bending strength at 20 mm bending [kPa] | Bending to 90° without breaking | Delamination | Min. diameter when bent/rolled [mm] | Reusable after bending to min. rolling diameter |
|---|---|---|---|---|---|---|---|---|---|---|---|---|
| 6-8 | CFB4/A2/CFB4 | 33% | 1.0 | 19.0 | — | — | — | — | — | No | — | — |
| 6-9 | CFB5/A2/CFB5 | 33% | 1.6 | — | — | — | — | — | — | Some | — | — |
| 6-10 | CFB4/A2/CFB4 | 33% | 2.0 | 18.0 | — | — | — | — | — | No | — | — |
| 6-11 | CFB6/A2/CFB6 | 33% | 2.2 | — | — | — | — | — | — | No | — | — |

TABLE 3

Physical and mechanical properties of Examples 7 and 8

| Example | Compression [Vol.-%] | Thickness [mm] | Density [kg/m³] | Thermal conductivity [mW/m*K] (p = 1 bar, T = 10° C.) | Total pore volume [cm³/g] | pore Volume <150 nm [cm³/g] | pore Volume <27 nm [cm³/g] |
|---|---|---|---|---|---|---|---|
| 7-C | 0% | 1.5 | 130 | 18.9 | 7.0 | 1.4 | 1.1 |
| 7-1 | 17% | 1.3 | 150 | 17.5 | 6.0 | 2.4 | 1.3 |
| 7-2 | 33% | 1.1 | 185 | 17.0 | 4.8 | 3.1 | 1.7 |
| 7-3 | 50% | 0.8 | 246 | 17.1 | 3.4 | 2.2 | 2.0 |
| 7-4 | 67% | 0.5 | 374 | 20.3 | 2.0 | 2.0 | 2.0 |
| 8-C | 0% | 1.4 | 101 | 17.4 | 9.2 | 4.5 | 1.6 |
| 8-1 | 17% | 1.3 | 110 | 16.8 | 8.4 | 4.1 | 2.0 |
| 8-2 | 33% | 1.0 | 139 | 15.7 | 6.5 | 3.4 | 2.6 |
| 8-3 | 50% | 0.8 | 185 | 15.5 | 4.8 | 3.6 | 3.4 |
| 8-4 | 67% | 0.5 | 279 | 19.7 | 2.9 | 2.5 | 2.5 |

TABLE 4

Physical and mechanical properties of Examples 9-14

| Example | Compression [Vol.-%] | Thickness [mm] | Density [kg/m³] | Thermal conductivity [mW/m*K] (p = 1 bar, T = 10° C.) | Flexural strength [MPa] | Bending [mm] | Bending modulus [MPa] | Total pore volume [cm³/g] | pore Volume <150 nm [cm³/g] | pore Volume <27 nm [cm³/g] |
|---|---|---|---|---|---|---|---|---|---|---|
| 9-C | 0 | 7.9 | 96 | 18.2 | 0.6 | 9.3 | 18 | 9.8 | | |
| 9-1 | 29 | 8.0 | 94 | 16.9 | 0.4 | 5.5 | 11 | 10.0 | | |
| 10-C | 0 | 7.7 | 130 | 18.3 | 1.1 | 10.2 | 33 | 7.0 | | |
| 10-1 | 21 | 7.9 | 129 | 16.3 | 0.9 | 11.3 | 26 | 7.1 | | |
| 10-2 | 45 | 8.0 | 123 | 15.5 | 0.6 | 8.8 | 15 | 7.5 | | |
| 11-C | 0 | 7.9 | 153 | 19.0 | 1.9 | 7.3 | 84 | 5.9 | | |
| 11-1 | 10 | 7.8 | 150 | 17.4 | 1.1 | 9.2 | 36 | 6.0 | | |
| 11-2 | 30 | 8.1 | 141 | 15.7 | 1.0 | 11.1 | 27 | 6.4 | | |
| 11-3 | 18 | 7.9 | 182 | 17.7 | 1.8 | 11.9 | 56 | 4.8 | | |
| 11-4 | 26 | 8.1 | 175 | 16.5 | 1.6 | 11.9 | 47 | 5.1 | | |
| 11-5 | 45 | 7.9 | 183 | 15.2 | 1.4 | 10.8 | 41 | 4.8 | | |
| 12-C | 0 | 7.7 | 224 | 23.2 | 2.6 | 9.5 | 101 | 3.8 | | |
| 12-1 | 29 | 8.1 | 214 | 17.7 | 2.3 | 12.4 | 65 | 4.0 | | |
| 12-2 | 38 | 8.1 | 212 | 16.7 | 2.2 | 12.4 | 60 | 4.1 | | |
| 12-3 | 18 | 8.0 | 270 | 22.5 | 2.1 | 5.3 | 123 | 3.1 | | |
| 12-4 | 46 | 7.9 | 275 | 18.7 | 2.5 | 7.8 | 102 | 3.0 | | |
| 13-C | 0 | 14.3 | | 19.4 | | | | | | |
| 13-1 | 19 | 11.6 | | 17.4 | | | | | | |
| 13-2 | 35 | 9.3 | | 16.1 | | | | | | |
| 14-C | 0 | 15.7 | | 17.9 | | | | | | |
| 14-1 | 24 | 11.9 | | 16.2 | | | | | | |
| 14-2 | 34 | 10.3 | | 15.5 | | | | | | |

TABLE 5

Chemical composition of Examples 9-12

| Example | MDEA [g] | Ksorbate solution [g] | Exolit OP 560 [g] | Butanol [g] | M200 [g] | MEK [g] |
|---|---|---|---|---|---|---|
| 9-C | 2.31 | 0.58 | 0.58 | 1.16 | 13.86 | 156.00 |
| 9-1 | 2.32 | 0.58 | 0.58 | 1.16 | 13.95 | 231.81 |
| 10-C | 3.00 | 0.75 | 0.75 | 1.50 | 18.02 | 150.73 |
| 10-1 | 3.03 | 0.76 | 0.76 | 1.52 | 18.19 | 204.74 |
| 10-2 | 3.03 | 0.76 | 0.76 | 1.52 | 18.19 | 302.36 |
| 11-C | 3.47 | 0.87 | 0.87 | 1.73 | 20.79 | 147.22 |
| 11-1 | 3.49 | 0.87 | 0.87 | 1.75 | 20.95 | 175.23 |
| 11-2 | 3.47 | 0.87 | 0.86 | 1.73 | 20.79 | 233.99 |
| 11-3 | 4.33 | 1.08 | 1.08 | 2.17 | 25.99 | 184.03 |
| 11-4 | 4.32 | 1.08 | 1.08 | 2.16 | 25.91 | 216.68 |
| 11-5 | 4.33 | 1.08 | 1.08 | 2.17 | 25.99 | 292.49 |
| 12-C | 5.08 | 1.27 | 1.27 | 2.54 | 30.49 | 134.94 |
| 12-1 | 5.11 | 1.28 | 1.27 | 2.56 | 30.67 | 217.15 |
| 12-2 | 5.07 | 1.27 | 1.26 | 2.53 | 30.41 | 254.36 |
| 12-3 | 6.48 | 1.62 | 1.62 | 3.24 | 38.88 | 172.05 |
| 12-4 | 6.50 | 1.62 | 1.62 | 3.25 | 38.99 | 276.04 |

The invention claimed is:

1. A molding based on a monolithic organic aerogel, having a density in the range from 60 to 300 kg/m$^3$, and a thermal conductivity in the range from 12 to 17.8 mW/m*K, measured according to DIN EN 12667:2001-05 at 10° C. and 101,325 Pa, and
wherein the molding comprises 40 to 80 vol.-% of pores with a diameter of less than 150 nm, 21 to 75 vol.-% of pores with a diameter of less than 27 nm, based on a total pore volume; wherein the fraction of pores with diameter of 150 nm and higher is 20-60 vol %;
wherein the molding is in the form of a sheet with a thickness in the range from 100 µm to 10 mm; and
wherein the monolithic organic aerogel is based on polyurethane, polyurea or polyisocyanurate or mixtures thereof.

2. The molding as defined in claim 1, which has a compression strength in the range from 600-700 kPa, determined according to DIN EN ISO 844:2014-11.

3. The molding as defined in claim 1, which has a flexural strength in the range from 1000-5000 KPa, determined according to DIN EN 12089:2013-06.

4. The molding as defined in claim 1, wherein the monolithic organic aerogel is a monolithic aerogel based on the polyurethane (PU) and/or the polyurea (PUR) with less than 80% of the polyisocyanurate (PIR) structures.

5. The molding as defined in claim 1, which has a density in the range from 140 to 240 kg/m$^3$.

6. A process for preparing the molding as defined in claim 1, the process comprising:
compressing a molding based on an organic aerogel with a density in the range from 50 to 140 kg/m$^3$, and with a compression factor in the range from 5 to 70 vol.-%.

7. The process according to claim 6, wherein the compression is performed in a hydraulic or pneumatic press.

8. The process as defined in claim 6, wherein the molding based on an organic aerogel is compressed in the form of a sheet unidirectional in the direction of the thickness of the sheet.

9. The process as defined in claim 6, wherein the compression is performed in a hydraulic or pneumatic press at a temperature of the molding between 10° and 80° C.

10. A process for preparing the molding as defined in claim 1, the process comprising:
a) reacting a mixture (A) comprising at least one polyfunctional isocyanate (a1), at least one aromatic amine (a2), and at least a catalyst (a3), in the presence of a solvent (B), to form a gel,
b) drying the gel obtained in a) under supercritical conditions, to obtain a dried gel,
c) optionally, cutting the dried gel into sheets with a thickness in the range from 0.1 to 10 mm, and
d) compressing the dried gel to a density in the range from 100 to 300 kg/m$^3$.

11. A thermal insulation material, comprising the molding according to claim 1 as an aerogel layer A), and at least one cover layer C) with a thickness in the range from 10 µm to 1 mm.

12. A process for preparing a thermal insulation material according to claim 11, the process comprising:
a) reacting a mixture (A) comprising at least one polyfunctional isocyanate (a1), at least one aromatic amine (a2), and at least a catalyst (a3), in the presence of a solvent (B), to form a gel,
b) drying the gel obtained in a) under supercritical conditions, to form a monolithic aerogel,
c) optionally, cutting the monolithic aerogel into sheets with a thickness in the range from 0.1 to 10 mm,
compressing the monolithic aerogel from b) to a density in the range from 100 to 300 kg/m$^3$, to obtain the aerogel layer A), and
e) applying at least one cover layer C), optionally, by an adhesive layer B), to the aerogel layer A) obtained in d).

13. The thermal insulation material as defined in claim 11, wherein the thermal insulation material is a thermal insulation material in building and/or construction, in a refrigeration appliance, in an electronic device, in aerospace, and/or in a battery.

* * * * *